United States Patent [19]

Yamamoto

[11] Patent Number: 5,754,905
[45] Date of Patent: May 19, 1998

[54] CAMERA WITH BODY AND BACKSIDE PLATE FORMED FOR FILM SLIT ENTRY

[75] Inventor: Harushige Yamamoto, Kanagawa-ken, Japan

[73] Assignee: Canon Kabushiki Kaisha, Tokyo, Japan

[21] Appl. No.: 717,205

[22] Filed: Sep. 20, 1996

Related U.S. Application Data

[63] Continuation of Ser. No. 559,127, Nov. 17, 1995, abandoned.

[30] Foreign Application Priority Data

Nov. 29, 1994 [JP] Japan .................. 6-294896
Oct. 16, 1995 [JP] Japan .................. 7-267055

[51] Int. Cl.$^6$ .................................................. G03B 17/00
[52] U.S. Cl. .................... 396/415; 396/440; 396/535
[58] Field of Search ............................. 396/439, 440, 396/535, 415; 352/221, 224, 225, 228

[56] References Cited

U.S. PATENT DOCUMENTS

| | | |
|---|---|---|
| 2,425,217 | 8/1947 | Wienke .................. 352/221 |
| 3,183,521 | 5/1965 | Goldstein ............... 352/221 |
| 3,252,370 | 5/1966 | Luther ................... 354/203 |
| 4,132,473 | 1/1979 | Kondo ................... 354/203 |
| 4,218,801 | 8/1980 | Stewart ................. 352/224 |
| 4,364,653 | 12/1982 | Terada .................. 354/203 |
| 4,744,651 | 5/1988 | Beauviala .............. 352/225 |
| 4,860,041 | 8/1989 | Harvey .................. 396/535 |
| 4,992,812 | 2/1991 | Smart .................... 354/203 |
| 5,142,316 | 8/1992 | Tanii et al. ........... 396/535 |
| 5,450,150 | 9/1995 | Smart et al. ........... 354/203 |
| 5,521,688 | 5/1996 | Ezawa ................... 396/440 |

Primary Examiner—Eddie C. Lee
Attorney, Agent, or Firm—Robin, Blecker & Daley

[57] ABSTRACT

A camera according to the present invention is arranged to introduce the leading end portion of a film accommodated in a film cartridge into a slit portion formed between a pressure plate member and a camera body, by rotating the spool of the film cartridge loaded in the camera. The camera includes a gate portion formed adjacent to an inlet portion of the slit portion, for guiding the leading end portion of the film, and the gate portion is formed by utilizing a member which constitutes the slit portion.

12 Claims, 4 Drawing Sheets

CAMERA WITH BODY AND BACKSIDE PLATE FORMED FOR FILM SLIT ENTRY

This is a continuation application under 37 CFR 1.62 of prior application Ser. No. 08/559,127, filed Nov. 17, 1995 now abandoned.

BACKGROUND OF THE INVENTION

1. Field of the Invention

The present invention relates to a camera which uses a film completely wound around within a film cartridge.

2. Description of the Related Art

In general, a film for use in conventional cameras is accommodated in a film cartridge with its leading end portion being drawn from the film cartridge, and if photography is to be performed, such a film cartridge is loaded into a camera. It is also known to provide a film of the type which is completely wound in a film cartridge, and a camera suitable for use with such a film. When the film cartridge is loaded into the camera, the spool of the film cartridge is rotationally driven to supply the film from the film cartridge, and the leading end portion of the film is guided to a slit portion formed between a pressure plate of the camera and an aperture portion of the camera body. The leading end portion of the film is transported through the slit portion and is then wound around the film take-up spool of the camera, whereby initial setting is completed.

To smoothly guide the leading end portion of the film to the slit portion formed between the pressure plate of the camera and the aperture portion of the camera body, it is necessary to provide a gate portion having a cross-sectional shape which is progressively reduced toward the slit portion to guide the leading end portion of the film to the slit portion. To form the slit portion, it is necessary to separately prepare the pressure plate and the camera body and assemble them in a manner similar to that in which a pressure plate and a camera body are assembled into a conventional camera. It is, therefore, necessary to prepare the gate portion as a separate member. However, such an arrangement involves the problem of increases in component and assembly costs.

SUMMARY OF THE INVENTION

It is, therefore, an object of the present invention to solve the above-described problem.

To achieve the above-described object, according to one aspect of the present invention, a camera, which is arranged to perform automatic loading of a film accommodated in a film cartridge by guiding a leading end portion of the film to a slit portion formed between a pressure plate and an aperture portion of a body of the camera while rotating a spool of the film cartridge loaded in the camera, includes a gate portion having an internal shape which is progressively reduced in cross section toward the slit portion to guide the leading end portion of the film to the slit portion, and the gate portion is formed by utilizing a member which constitutes the slit portion. Since it is not necessary to prepare the gate portion as a separate member, it is possible to realize an inexpensive camera.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS (First Embodiment)

Figure 1:
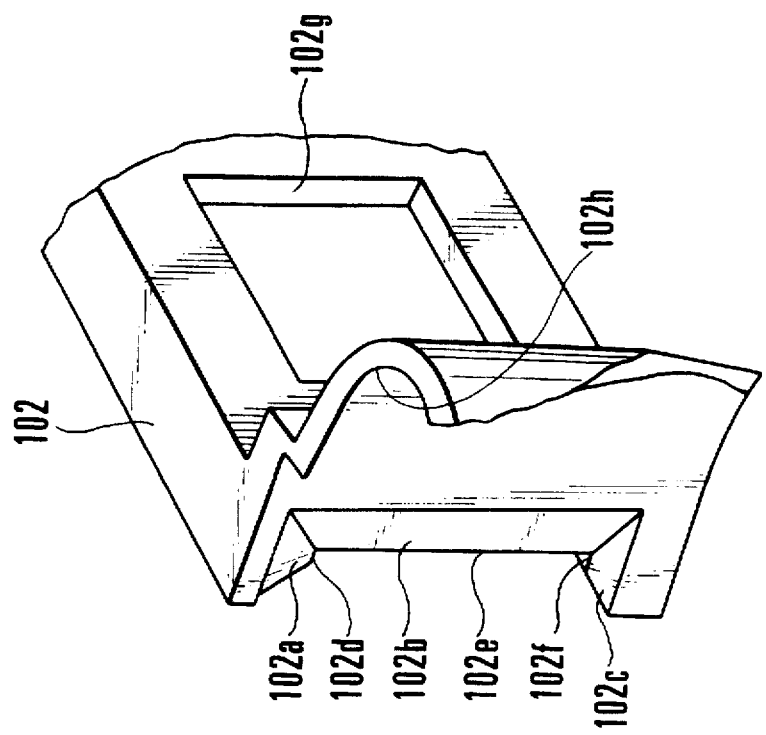
FIG. 1 is a diagrammatic perspective view showing the essential portion of a camera according to a first embodiment of the present invention.
Figure 1:
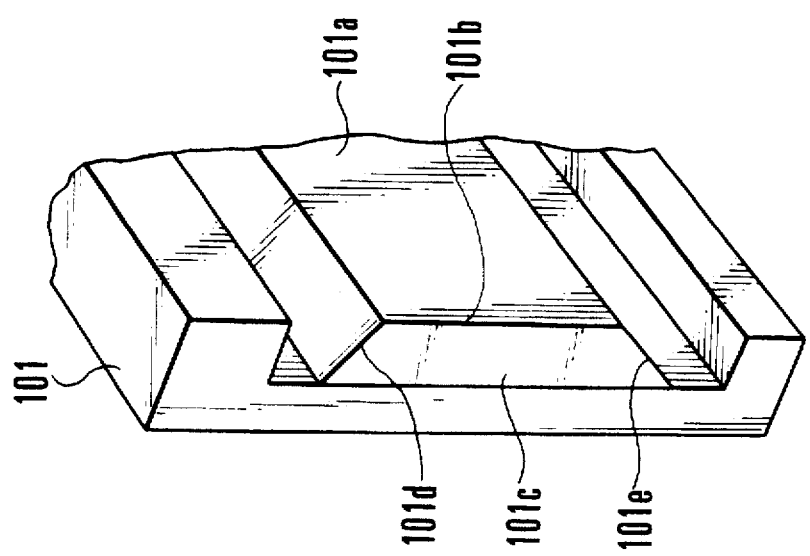

FIG. 1 is a diagrammatic perspective view showing the essential portion of a camera according to a first embodiment of the present invention. In FIG. 1, a pressure plate member and a camera body are indicated by 101 and 102, respectively.

A film receiving part 101a is provided for guiding the back face of a film, and an end 101b of the film receiving part 101a forms one opening edge of a slit portion. The end 101b which forms the one opening edge adjoins one face 101c which forms part of a gate portion for guiding the film to the slit portion.

The camera body 102 has three faces 102a, 102b and 102c which form the remaining three faces of the gate portion. The gate portion has a cross-sectional shape which is progressively reduced toward the slit portion, and three opening edges 102d, 102e and 102f which form part of the slit portion are respectively formed at the slit-side ends of the faces 102a, 102b and 102c of the gate portion. When the pressure plate member 101 and the camera body 102 are assembled to oppose the film receiving part 101a to the back side of the camera body 102, the slit portion is formed which has a cross-sectional shape defined by the opening edges 101b, 102d, 102e and 102f. In FIG. 1, reference numeral 102h denotes a film cartridge chamber, and reference numeral 102g denotes an aperture.

Figure 2:
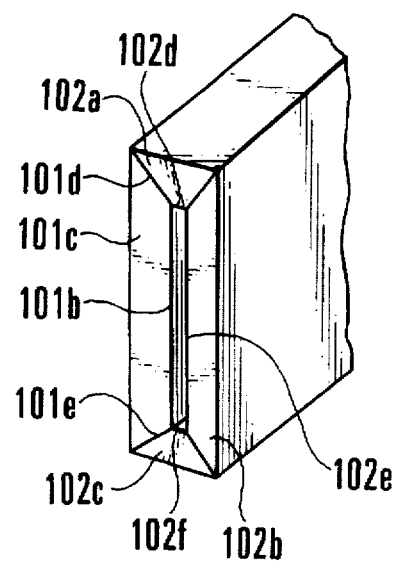
FIG. 2 is a diagrammatic perspective view showing the assembled state of the essential portion of the camera according to the first embodiment of the present invention.

FIG. 2 is a diagrammatic perspective view showing the gate portion and the slit portion which are formed when the pressure plate member 101 and the camera body 102 are assembled. When the pressure plate member 101 and the camera body 102 are assembled, parting lines 101d and 101e are formed which respectively coincide with two of the root lines of the gate portion.

(Second Embodiment)

Figure 3:
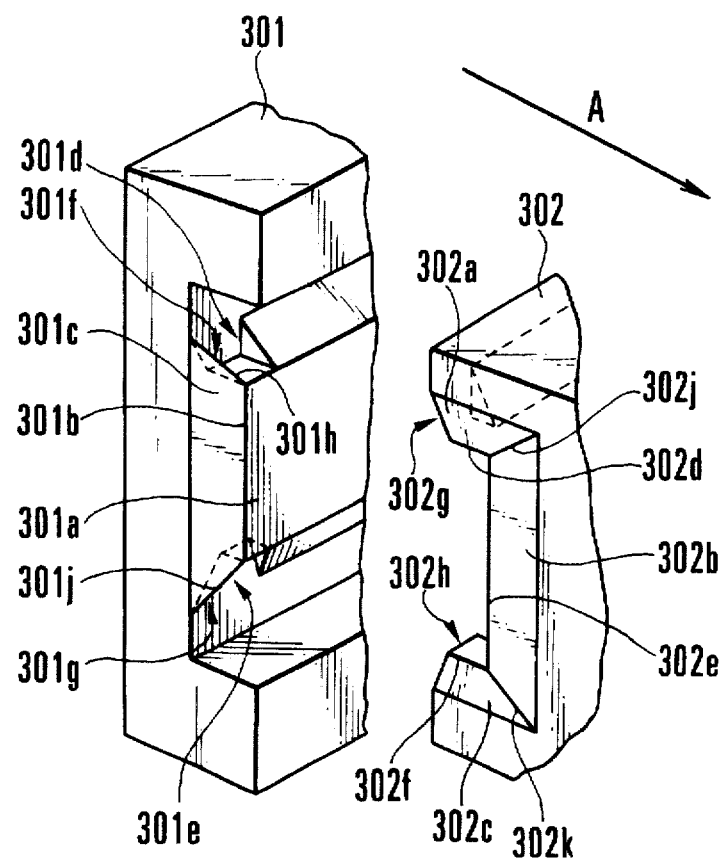
FIG. 3 is a diagrammatic perspective view showing the essential portion of a camera according to a second embodiment of the present invention.

FIG. 3 is a diagrammatic perspective view showing the essential portion of a camera according to a second embodiment of the present invention. In FIG. 3, a pressure plate member and a camera body are respectively indicated by 301 and 302.

Similarly to the first embodiment described above, a film receiving part 301a is provided for guiding the back face of a film, and an end 301b of the film receiving part 301a forms one opening edge of a slit portion. The end 301b which forms the one opening edge adjoins one face 301c which forms part of a gate portion for guiding the film to the slit portion.

The camera body 302 has three faces 302a, 302b and 302c which form the remaining three faces of the gate portion.

The gate portion has a cross-sectional shape which is progressively reduced toward the slit portion, and three opening edges 302d, 302e and 302f which form part of the slit portion are respectively formed at the slit-side ends of the faces 302a, 302b and 302c of the gate portion.

The pressure plate member 301 has recesses 301d and 301e into which to fit corresponding projections 302g and 302h of the camera body 302 when the pressure plate member 301 and the camera body 302 are assembled. The respective recesses 301d and 301e have side faces 301f and 301g which are respectively approximately parallel to the faces 302a and 302c of the gate portion. When the pressure plate member 301 and the camera body 302 are assembled, the faces 302a and 302c of the gate portion are partly fitted into the corresponding recesses 301d and 301e.

The root lines of the gate portion are respectively formed by a boundary line 301h between the side face 301f and the face 301c of the gate portion of the pressure plate member 301, a boundary line 301j between the side 301g and the face 301c, a boundary line 302j between the face 302b and the face 302a of the gate portion of the camera body 302, and a boundary line 302k between the face 302b and the face 302c.

(Third embodiment)

Figure 4:
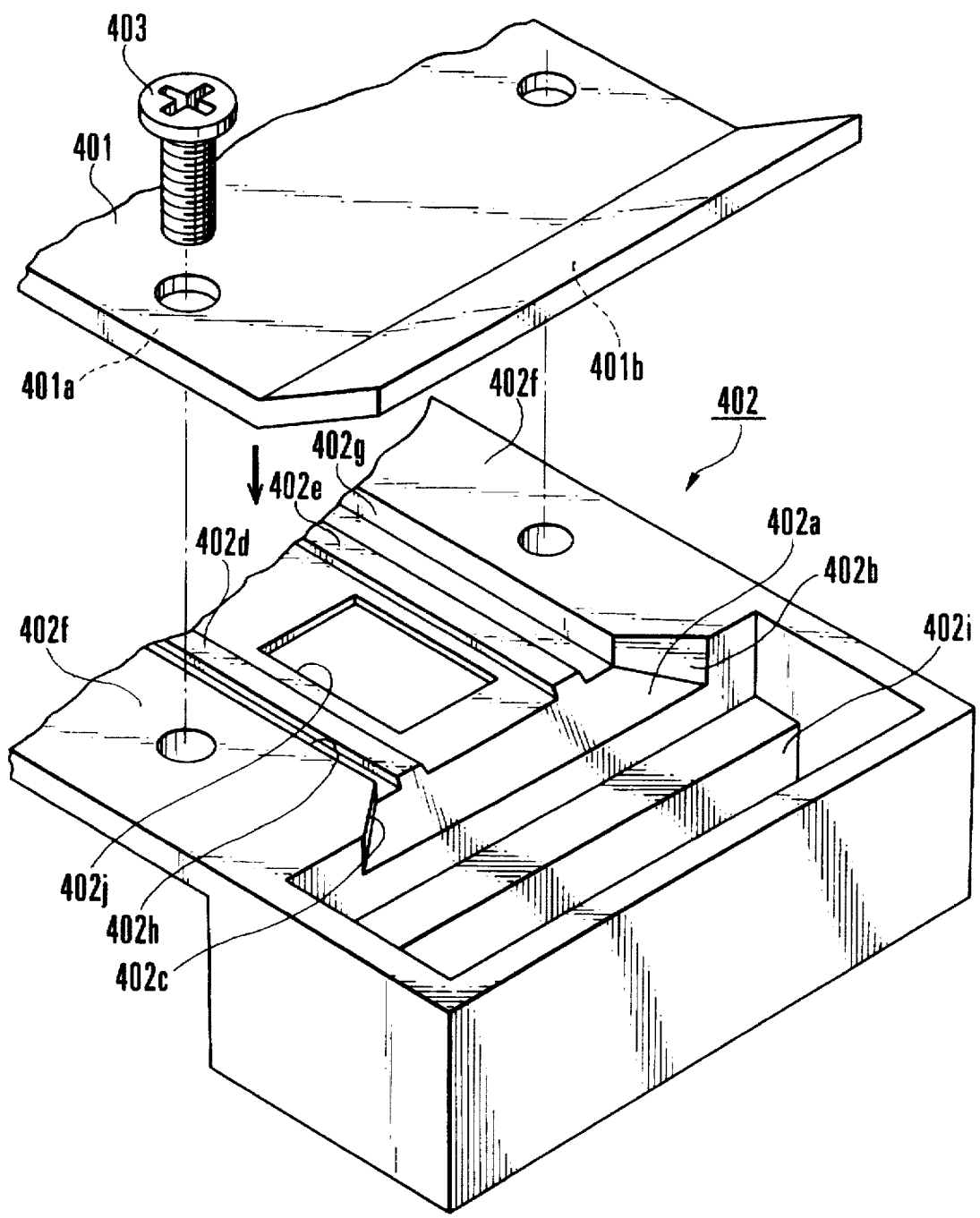
FIG. 4 is a diagrammatic perspective view showing the essential portion of a camera according to a third embodiment of the present invention.

FIG. 4 is a diagrammatic perspective view showing a camera according to a third embodiment of the present invention. In FIG. 4, a pressure plate member is indicated by 401 and a camera body is indicated by 402.

The pressure plate member 401 includes a film receiving part 401a which is a flat portion for guiding the back face of a film. One side of the pressure plate member 401 is formed as an upward bent portion 401b which serves as one face of the gate portion for guiding the film to a slit portion.

The camera body 402 has three faces 402a, 402b and 402c which form the remaining three faces of the gate portion. When the pressure plate member 401 is fixed to the camera body 402 with a screw 403 or the like, the upward bent portion 401b and the faces 402a, 402b and 402c constitute the gate portion.

Rail faces 402d and 402e serve to position the front face of the film. The step difference (difference in height) between a pressure-member mounting face 402f and the rail faces 402d and 402e forms the slit portion when the pressure plate member 401 is fixed to the camera body 402. The upper and lower portions (the right and left portions, as viewed in FIG. 4) of the slit portion are formed by step faces 402g and 402h, respectively.

The gate portion and the slit portion which are formed in the above-described manner will be described in more detail for the purpose of a better understanding thereof. The gate portion is formed by the upward bent portion 401b and the faces 402a, 402b and 402c, while the slit portion is formed by the film receiving part 401a, the rail faces 402d and 402e, and the step faces 402g and 402h. The rail faces 402d and 402e have the same height.

The gate portion and the slit portion adjoin in such a manner that the upward bent portion 401b meets the film receiving part 401a and the respective faces 402a, 402b and 402c meet each of the rail faces 402d and 402e, the step face 402g and the step face 402h. Accordingly, the film of a film cartridge 500 which is loaded into a cartridge chamber 402i can be smoothly guided to the slit portion.

Figure 5:
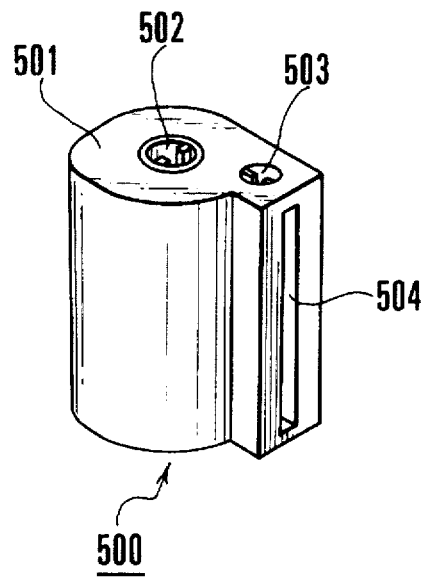
FIG. 5 is a diagrammatic perspective view showing a film cartridge for use in each of the embodiments of the present invention.

FIG. 5 is a diagrammatic perspective view showing the film cartridge 500 to be applied to the camera according to the third embodiment. A cartridge body 501 contains an unexposed film wound around a spool 502. An operating part 503 serves to open and close a light-shielding door (not shown) for shielding a film exit 504 from light.

When the film cartridge 500 is loaded into the camera and the operating part 503 is rotationally driven by means (not shown), the film exit 504 is opened to enable the film to be supplied. Then, when a fork (winding/rewinding member) (not shown) engaged with the spool 502 is rotated clockwise as viewed in FIG. 5, the spool 502 is also rotated clockwise, so that the unexposed film is supplied through the film exit 504.

Figure 6:
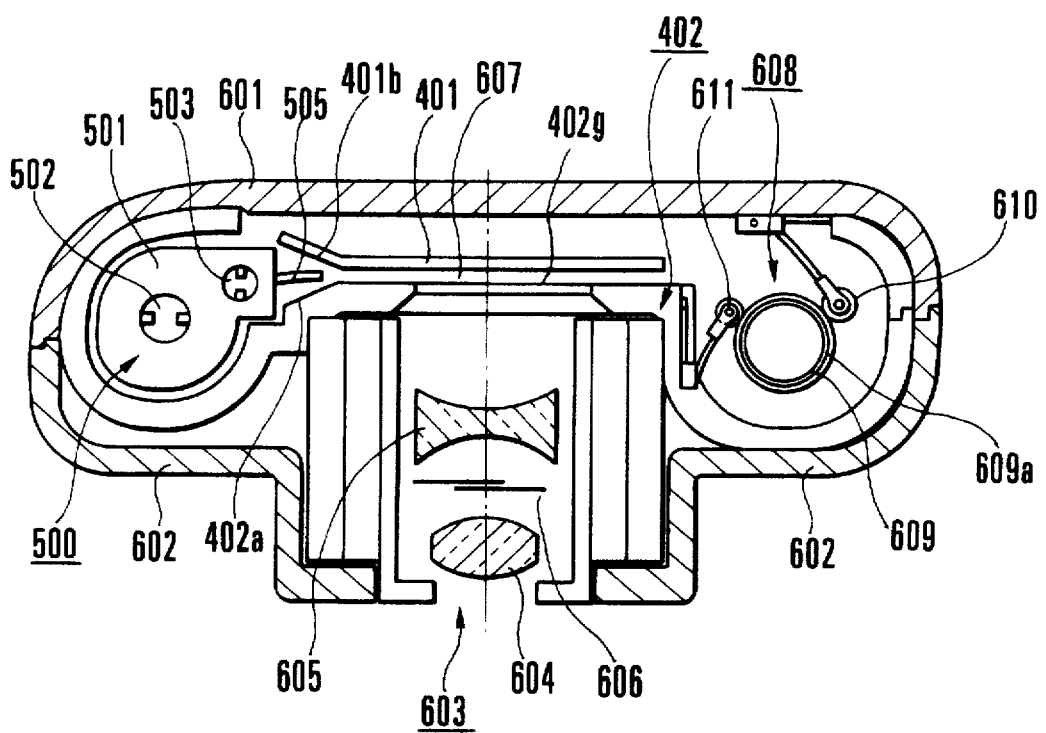
FIG. 6 is a diagrammatic cross-sectional view showing the essential portion of the camera of FIG. 4 and the film cartridge.

FIG. 6 is a diagrammatic cross-sectional view aiding in describing the manner in which a film 505 is supplied with the film cartridge 500 being loaded in the camera according to the third embodiment. As described previously, the camera has the pressure plate member 401 and the camera body 402 having an aperture 402j. The camera also includes a back cover 601 for covering the back of the camera body 402, a front cover 602 for covering the front face of the camera body 402, and a photographic lens unit 603 which is arranged to expose the film 505 to a subject image by the operations of photographic lenses 604 and 605 and a shutter 606.

When the film cartridge 500 is loaded into the cartridge chamber of the camera body 402 and the spool 502 is rotated clockwise in the above-described manner, the film 505 is supplied from the film cartridge 500. At this time, in whichever direction the leading end portion of the film 505 is turned, the upward bent portion 401b, which is formed on the side of the pressure plate member 401 in the above-described manner, and the face 402a, which is formed on the side of the camera body 402 in the above-described manner, guide the leading end portion of the film 505 on the opposite faces thereof, whereby the leading end portion can be correctly introduced into the slit portion 607.

In addition, the leading end portion of the film 505 can be guided on the top and bottom sides thereof (the direction perpendicular to the sheet surface of FIG. 6) by the faces 402b and 402c formed on the side of the camera body 402, whereby the leading end portion can be correctly introduced into the slit portion 607. After the leading end portion of the film 505 is introduced into the slit portion 607 through the gate portion in the above-described manner, the film 505 is further supplied from the film cartridge 500 and transported into a spool chamber 608 through the slit portion 607. At this time, the leading end portion of the film 505 is positioned into contact with the external circumference of a film take-up spool 609 by a back cover roller 610, which is fixed to the back cover 601 and elastically pressed against the film take-up spool 609, and a body roller 611, which is fixed to the camera body 402 and elastically pressed against the film take-up spool 609. The film take-up spool 609 has a friction producing member 609a, such as rubber, fixed to the external circumference, and is rotationally driven clockwise as viewed in FIG. 6 by known means. When the film 505 is supplied by a predetermined amount, the film 505 is tightly wound around the film take-up spool 609 by the action of the friction producing member 609a. Then, the transmission of the rotational driving force to the film supply spool 502 is cancelled, and the film 505 is wound only by the rotating force of the film take-up spool 609.

A so-called automatic loading operation which is performed when the film cartridge 500 is loaded into the camera is completed in the above-described manner. After that, each time one frame of the film 505 is exposed, the film take-up spool 609 is rotationally driven to perform a winding of the film 505.

At the time of rewinding of the film 505, the transmission of the driving force to the film take-up spool 609 is cancelled and the spool 502 of the film cartridge 500 is rotationally driven counterclockwise as viewed in FIG. 6, whereby the exposed film 505 is rewound in the film cartridge 500. When the rewinding of the exposed film 505 is completed and the film 505 is completely wound in the film cartridge 500, the operating part 503 for the light-shielding door is rotationally driven to close the light-shielding door, whereby a preparatory operation for unloading the film cartridge 500 from the camera is completed.

According to any of the above-described embodiments, it is possible to realize an inexpensive camera without the need to prepare an exclusive member for the gate portion.

In addition, the gate portion can be composed of the pressure plate member and the camera body member having the aperture.

In addition, the gate portion is formed in a cross-sectional shape which is progressively reduced toward a slit portion with the parting lines of the gate portion being coincident with some of the root lines of the same. Accordingly, the parting lines, which are the boundaries between the pressure plate member and the camera body member, are inclined with respect to the direction parallel to both faces of a film, so that the leading end of the film can be prevented from biting into the boundaries when the film is supplied from the film cartridge.

In addition, the two members which are assembled to form the gate portion are firmly engaged with each other and are positioned easily and securely. Accordingly, the two members can be highly accurately joined together at the boundaries therebetween to form the gate portion having the cross-sectional shape which is progressively reduced toward the slit portion and having a continuous funnel-shaped perimetric boundary, so that the leading end of the film can be more securely prevented from biting into the boundaries.

In addition, since the pressure plate member has a flat shape having a bent portion and the bent portion is used as part of the gate portion, the pressure plate member can be easily formed. For example, the pressure plate member may be formed not by resin molding but by metal pressing or the like.

What is claimed is:

1. A camera arranged to introduce a leading end portion of a film accommodated in a film cartridge into a slit portion formed between a backside plate member and a camera body, by rotating a spool of said film cartridge loaded in said camera, comprising a gate portion formed by four faces, expanding beyond said slit portion, and located adjacent to an inlet portion of said slit portion, for guiding said leading end portion of said film, said gate portion being formed by utilizing members which constitute said slit portion, and said backside plate member being immobile relative to said camera body.

2. A camera according to claim 1, wherein said gate portion has a cross-sectional shape which is progressively reduced toward said slit portion to guide said leading end portion of said film to said inlet portion of said slit portion.

3. A camera according to claim 2, wherein said gate portion is formed by a combination of said backside plate member and said camera body.

4. A camera according to claim 3, wherein a parting line between said backside plate member and said camera body coincides with a root line of said gate portion.

5. A camera according to claim 2, wherein said backside plate member and said camera body respectively have engagement portions which engage with each other in a direction perpendicular to a direction in which said film is transported.

6. A camera according to claim 2, wherein said camera body includes an aperture, a film cartridge chamber into which said film cartridge is loaded, and a spool chamber for a take-up spool, said aperture, said film cartridge chamber and said spool chamber being formed in unity with said body.

7. A camera according to claim 1, wherein said gate portion is formed by a combination of said backside plate member and said camera body.

8. A camera according to claim 7, wherein a parting line between said backside plate member and said camera body coincides with a root line of said gate portion.

9. A camera according to claim 7, wherein said camera body includes an aperture, a film cartridge chamber into which said film cartridge is loaded, and a spool chamber for a take-up spool, said aperture, said film cartridge chamber and said spool chamber being formed in unity with said body.

10. A camera according to claim 1, wherein said backside plate member having one of said four faces and said camera body having the remaining three faces.

11. A camera according to claim 10, wherein said camera body includes an aperture, a film cartridge chamber into which said film cartridge is loaded, and a spool chamber for a take-up spool, said aperture, said film cartridge chamber and said spool chamber being formed in unity with said body.

12. A camera according to claim 1, wherein said camera body includes an aperture, a film cartridge chamber into which said film cartridge is loaded, and a spool chamber for a take-up spool, said aperture, said film cartridge chamber and said spool chamber being formed in unity with said body.

* * * * *